Dec. 11, 1951            L. H. HEUER            2,577,964
TORSION BRAKE RELEASE SPRING
Filed June 21, 1949
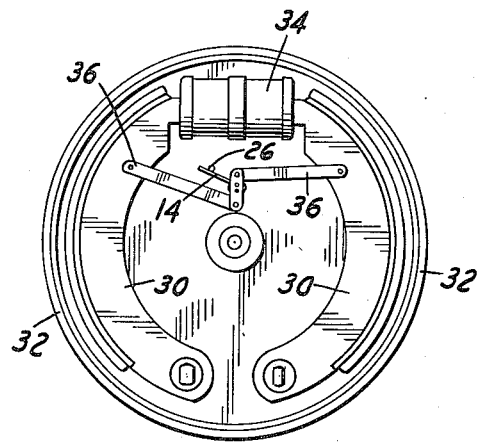
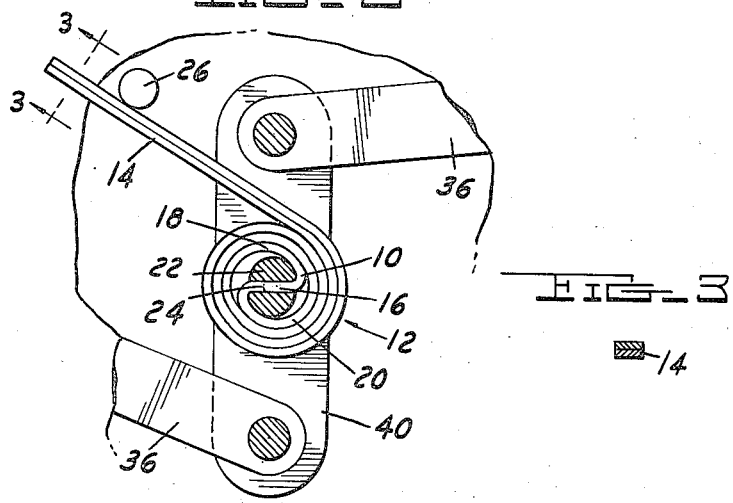
INVENTOR.
LAWRENCE H. HEUER
BY
Barnes, Kisselle, Laughlin & Raisch
ATTORNEYS Patented Dec. 11, 1951

2,577,964

UNITED STATES PATENT OFFICE 2,577,964

TORSION BRAKE RELEASE SPRING

Lawrence H. Heuer, Detroit, Mich., assignor to Automotive Spring Company, Detroit, Mich., a corporation of Michigan Application June 21, 1949, Serial No. 100,415

5 Claims. (Cl. 188—78)

This invention relates to a torsion brake release spring.

It is an object of the present invention to provide a new type of torsion spring formed from a single piece of metal having spring characteristics which is doubled upon itself to provide a double length and then rolled to form a flat coil with one end extending tangentially to the coil. The circular portion of the spring is designed with openings around a diametrical portion adjacent the double end of the spring for holding purposes in practical applications of the spring.

Another object of the invention is to provide an extremely high torsional strength in a small and compact spring.

Other objects and features of the invention will be apparent in the following description and claims.

Drawings accompany the specification, and the various views thereof may be briefly described as:

Figure 1, an elevation view of a braking mechanism showing the installation of the spring;

Figure 2, a close up view of the spring as applied; and

Figure 3, a sectional view on line 3—3 of Figure 2.

As shown particularly in Figure 2, the spring consists of a double length of spring material of relatively flat cross section which is doubled upon itself to form a bight portion 10 and then rolled to form a coil 12, with one double end extending at 14 tangentially of the coil 12. Centrally of the coil, one side of the spring at 16 extends diametrically of the coil and laminations 18 and 20 directly adjacent the portion 16 are spaced from the diametrical portion to provide semi-circular openings centrally of the coil.

In the application of a spring, post 22 pivotally mounted on the back plate of the brake housing and having a diametrical slot 24 can be used to grip the diametrical portion 16 at one end of the spring. At the other end of the spring, a stop 26 is provided.

In the particular adaptation of the spring to the braking system shown in Figure 1, the spring tends to pull brake shoes 30 away from the drum portion 32. The standard pneumatic or hydraulic cylinder 34 can be used for brake actuation. Links 36 connected respectively to the brake shoes are connected to opposite ends of a torsion bar 40 which may be composed of two pieces on either side of the link ends and between which is the pivot or grasping post 22 which pivotally mounts the bar 40. It will be seen that once the spring is loaded it will tend to return the torsion bar 40 to its original position against the action of the cylinder 34.

The double nature of the spring tends to increase the torsional strength thereof greatly and also provides a convenient way of a solid fastening means at the center of the spring, this fastening means being of a nature to reduce any concentrated load on the spring and thus prevent fatigue breakage.

It has been found that this double spring will carry much more load than a solid spring having dimensions equal to the double spring, the solid spring having a tendency to go beyond its limit of elasticity and take a set, whereas the present spring has much more resilience and yet will carry the load required of it.

What I claim is:

1. A torsion spring comprising a length of spring material of flat cross-section bent double and rolled upon itself to form a flat coil with a tangentially extending portion, a portion of the length adjacent the bight of the double length being separated from the adjacent portions of the length to form a fastening piece diametrically and centrally of the coil with openings on either side.

2. A torsion spring comprising a length of spring material of flat cross-section bent together to form a double portion and coiled around a central point with a portion of the double length extending tangentially away from the coil, a portion of the length adjacent the center of the coil being disposed diametrically of the coiled double portion to leave space for gripping the diametrical portion.

3. A torsion spring comprising a plurality of leaves of spring material coiled closely together and having the outer ends projecting as one fastening point, a portion common to the leaves extending diametrically and centrally of the coil and separated from the remainder of the leaves to form a second fastening point.

4. In a brake drum and shoe construction, expanding brake shoes movable to an operating and inactive position, a means to return the shoes to inactive position comprising a torsion bar centrally pivoted and linked at opposite ends to the brake shoes, a torsion spring comprising a double length of spring material coiled with a portion extending diametrically of an opening centrally of the coil and a portion at the other end extending tangentially of the coil, means on the torsion bar for engaging said diametrical portion and means adjacent the torsion bar for engaging the other end of the coil.

5. In a brake construction of the drum and shoe type, a brake drum housing, expanding shoes mounted therein for movement to an operating and inactive position, a means to return the shoes to inactive position comprising a torsion bar centrally pivoted on said housing and linked at opposite ends to the brake shoes, a torsion spring comprising a double length of spring material fashioned into a flat coil with a portion extending diametrically of an opening centrally of the coil and a portion at the other end extending tangentially of the coil, means on the torsion bar for engaging said diametrical portion and means on said housing for engaging the other end of said coil whereby the torsion bar is resiliently biased to a position holding said brake shoes in inactive position.

LAWRENCE H. HEUER.

REFERENCES CITED

The following references are of record in the file of this patent:

UNITED STATES PATENTS

| Number | Name | Date |
| --- | --- | --- |
| 268,989 | Bishop | Dec. 12, 1882 |
| 1,125,264 | Carmichael | Jan. 19, 1915 |
| 1,872,872 | Bendix | Aug. 23, 1932 |
| 1,997,253 | Fleagle | Apr. 9, 1935 |